United States Patent
Ozawa

(10) Patent No.: US 10,764,140 B2
(45) Date of Patent: Sep. 1, 2020

(54) COMMUNICATION SYSTEM, COMMUNICATION DEVICE, AND COMMUNICATION METHOD

(71) Applicant: NEC Corporation, Tokyo (JP)

(72) Inventor: Hirokazu Ozawa, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 512 days.

(21) Appl. No.: 15/548,156

(22) PCT Filed: Jan. 27, 2016

(86) PCT No.: PCT/JP2016/000384
§ 371 (c)(1),
(2) Date: Aug. 2, 2017

(87) PCT Pub. No.: WO2016/125455
PCT Pub. Date: Aug. 11, 2016

(65) Prior Publication Data
US 2018/0041394 A1 Feb. 8, 2018

(30) Foreign Application Priority Data
Feb. 5, 2015 (JP) .................. 2015-020985

(51) Int. Cl.
*H04L 12/24* (2006.01)
*G06F 11/00* (2006.01)
*G06F 11/16* (2006.01)

(52) U.S. Cl.
CPC .......... *H04L 41/0869* (2013.01); *G06F 11/00* (2013.01); *H04L 41/069* (2013.01); *H04L 41/0672* (2013.01); *H04L 41/082* (2013.01); *G06F 11/1666* (2013.01); *H04L 41/0889* (2013.01); *H04L 41/0893* (2013.01)

(58) Field of Classification Search
CPC ...................................................... G06F 8/656
See application file for complete search history.

(56) References Cited

U.S. PATENT DOCUMENTS

2013/0198507 A1* 8/2013 Kasuya .................. G06F 8/654
713/100

FOREIGN PATENT DOCUMENTS

JP        11-161478 A      6/1999
JP        2003290361 A  * 10/2003  ............ A61F 2/915
(Continued)

OTHER PUBLICATIONS

International Search Report of PCT/JP2016/000384 dated Apr. 12, 2016.

*Primary Examiner* — Tonia L Dollinger
*Assistant Examiner* — Ishrat Rashid
(74) *Attorney, Agent, or Firm* — Sughrue Mion, PLLC

(57) ABSTRACT

Provided is a communication device capable of minimizing effects on a continuously operated service after control software is updated. In a communication device (10), a control unit (11) stores information about the communication device (10) in a storage unit (12) before control software is updated. The control unit (11) compares, after updating the control software, information about the communication device (10) stored in the storage unit (12) with information about the communication device (10) obtained after updating the control software, and performs predetermined processing based on a result of the comparison.

16 Claims, 14 Drawing Sheets

(56) References Cited

FOREIGN PATENT DOCUMENTS

| JP | 2005-064709 A | 3/2005 |
|---|---|---|
| JP | 2013-161117 A | 8/2013 |

\* cited by examiner

|  | PATTERN 1 | PATTERN 2 | PATTERN 3 | PATTERN 4 |
|---|---|---|---|---|
| LinkStatus | Up | Up | Down | Down |
| CONFIGURATION INFORMATION PortEnable | Enable | Enable | Enable | Disable |
| CONFIGURATION INFORMATION ERPEnable | Enable | Disable | Enable | Disable |
| CPU INSIDE INFORMATION ERPStatus | Up | NA | Down | NA |

Fig. 3

| HW INFORMATION #1 | HW INFORMATION #2 | CPU INSIDE INFORMATION #3 | CONFIGURATION INFORMATION #4 | CONFIGURATION INFORMATION #5 |
|---|---|---|---|---|
| PortEnable =Port1 Enable | PortEnable =Port1 Enable | ERPStatus =Port1 Up | PortEnable =Port1 Enable | PortEnable =Port1 Enable |
| LinkStatus =Port1 Down | LinkStatus =Port1 Up | | ERPEnable =Port1 Enable | ERPEnable =Port1 Enable |

Fig. 6

| HW INFORMATION #1 | HW INFORMATION #2 | CPU INSIDE INFORMATION #3 | CONFIGURATION INFORMATION #4 | CONFIGURATION INFORMATION #5 |
|---|---|---|---|---|
| PortEnable =Port1 Enable | PortEnable =Port1 Enable | ERPStatus =Port1 Up | PortEnable =Port1 Enable | PortEnable =Port1 Enable |
| LinkStatus =Port1 Up | LinkStatus =Port1 Down | | ERPEnable =Port1 Enable | ERPEnable =Port1 Enable |

Fig. 8

| HW INFORMATION #1 | HW INFORMATION #2 | CPU INSIDE INFORMATION #3 | CONFIGURATION INFORMATION #4 | CONFIGURATION INFORMATION #5 |
|---|---|---|---|---|
| PortEnable =Port1 Enable | PortEnable =Port1 Enable | ERPStatus =Port1 Down | PortEnable =Port1 Enable | PortEnable =Port1 Enable |
| LinkStatus =Port1 Up | LinkStatus =Port1 Up | | ERPEnable =Port1 Enable | ERPEnable =Port1 Enable |

Fig. 10

| HW INFORMATION #1 | HW INFORMATION #2 | CPU INSIDE INFORMATION #3 | CONFIGURATION INFORMATION #4 | CONFIGURATION INFORMATION #5 |
|---|---|---|---|---|
| PortEnable =Port1 Enable | PortEnable =Port1 Enable | ERPStatus =Port1 Up | PortEnable =Port1 Disable | PortEnable =Port1 Enable |
| LinkStatus =Port1 Up | LinkStatus =Port1 Up | | ERPEnable =Port1 Enable | ERPEnable =Port1 Enable |

Fig. 12

| HW INFORMATION #1 | HW INFORMATION #2 | CPU INSIDE INFORMATION #3 | CONFIGURATION INFORMATION #4 | CONFIGURATION INFORMATION #5 |
|---|---|---|---|---|
| PortEnable =Port1 Enable | PortEnable =Port1 Enable | ERPStatus =Port1 Up | PortEnable =Port1 Enable | PortEnable =Port1 Disable |
| LinkStatus =Port1 Up | LinkStatus =Port1 Up | | ERPEnable =Port1 Enable | ERPEnable =Port1 Enable |

Fig. 14

COMMUNICATION SYSTEM, COMMUNICATION DEVICE, AND COMMUNICATION METHOD

CROSS REFERENCE TO RELATED APPLICATIONS

This application is a National Stage of International Application No. PCT/JP2016/000384 filed Jan. 27, 2016, claiming priority based on Japanese Patent Application No. 2015-020985 filed Feb. 5, 2015, the contents of all of which are incorporated herein by reference in their entirety.

TECHNICAL FIELD

The present invention relates to a communication system, communication device, and a communication method, and more particularly, to a communication system, a communication device, and a communication method in which a management server configures settings for HW (hardware) within the communication device.

BACKGROUND ART

In the case of operating a service for transferring data on a network, a communication device is disposed on the network. The communication device generally includes HW (hardware) such as L2SW (Layer 2 Switch), and a control CPU (Central Processing Unit) that controls the HW according to a control program. Incidentally, the communication device updates the control software, as needed, so as to improve functions or correct problems. At this time, the communication device is required to implement ISSU (In Service Software Upgrade), which is a technique for completing an updating operation for control software in-service without interrupting data transfer so as to continuously operate the service.

As a system for implementing the ISSU, a system in which information held by a control CPU is stored before a control program is updated and the information is restored after the control program is updated is generally employed. However, due to some causes, the information restored by the control CPU may be inconsistent with information held by a management server or information held by HW. This is caused because, for example, the setting for the HW is changed by the management server during a period in which the information held by the control CPU is stored and restored. In this case, it is necessary to specify the location where there is an inconsistency. However, assuming that a system administrator has to determine whether or not there is an inconsistency in the information restored by the control CPU, there is a need to temporarily stop the service every time the control software is updated. Accordingly, there is a demand for minimizing adverse effects on the continuously operated service, even when there is an inconsistency in the information restored by the control CPU.

A related art is disclosed in, for example, PTL 1. In the technique disclosed in PTL 1, a difference record indicating a difference between a record of the current generation and a record obtained one generation ago (environmental elements changed during a transfer to the current generation, and operation information obtained in the current generation) is generated and the difference record is displayed in the case of a failure or the like.

CITATION LIST

Patent Literature

Patent Literature 1: Japanese Unexamined Patent Application Publication No. H11-161478

SUMMARY OF INVENTION

Technical Problem

However, the technique disclosed in PTL 1 is used to display a difference record, for example, in the case of a failure. Accordingly, at the time of updating the control software, it is necessary for the system administrator to determine whether there is an inconsistency in the information obtained before updating the control software and the information obtained after updating the control software. Therefore, the problem that there are adverse effects on the continuously operated service has not been solved yet.

Therefore, an object of the present invention is to solve the above-mentioned problem and provide a communication system, a communication device, and a communication method which are capable of minimizing adverse effects on a continuously operated service even if an inconsistency occurs in information held by a control unit after control software is updated.

Solution to Problem

In one aspect, a communication system includes: a communication device to be controlled by control software; and a management server configured to hold information about the communication device. The communication device stores the information about the communication device before updating the control software. The communication device compares, after updating the control software, information about the communication device with information about the communication device obtained after updating the control software, and performs predetermined processing based on a result of the comparison.

In another aspect, a communication device is controlled by control software and includes a storage unit and a control unit. The control unit stores, before updating the control software, information about the communication device in the storage unit, and the control unit compares, after updating the control software, information about the communication device stored in the storage unit with information about the communication device obtained after updating the control software, and performs predetermined processing based on a result of the comparison.

In still another aspect, a first communication method is a communication method that is performed by a communication system including a communication device controlled by control software and a management server. This method includes: holding, by the management server, information about the communication device; storing, by the communication device, information about the communication device before updating the control software; and comparing, by the communication device, the stored information about the communication device with information about the communication device obtained after updating the control software after updating the control software, and performing predetermined processing based on a result of the comparison.

In still one more aspect, a second communication method is a communication method that is performed by a communication device controlled by control software. This method includes: storing information about the communication device before updating the control software; and comparing, after updating the control software, the stored information about the communication device with information about the communication device obtained after updating the control software, and performing predetermined processing based on a result of the comparison.

Advantageous Effects of Invention

According to the above-mentioned aspects, the present invention has an advantageous effect that, even when there is an inconsistency in information held by a control unit after control software is updated, adverse effects on a continuously operated service can be minimized.

BRIEF DESCRIPTION OF DRAWINGS

FIG. 3 is a diagram showing an example of an internal control table according to the second embodiment;

FIG. 6 is a diagram showing an example of a state of each piece of information in Specific Example 1 of determination processing in step S2 shown in FIG. 4;

FIG. 8 is a diagram showing an example of a state of each piece of information in Specific Example 2 of determination processing in step S2 shown in FIG. 4;

FIG. 10 is a diagram showing an example of a state of each piece of information in Specific Example 3 of determination processing in step S2 shown in FIG. 4;

FIG. 12 is a diagram showing an example of a state of each piece of information in Specific Example 4 of determination processing in step S2 shown in FIG. 4;

FIG. 14 is a diagram showing an example of a state of each piece of information in Specific Example 5 of determination processing in step S2 shown in FIG. 4.

DESCRIPTION OF EMBODIMENTS

Embodiments of the present invention will be described below with reference to the drawings.

(1) First Embodiment

Figure 1:
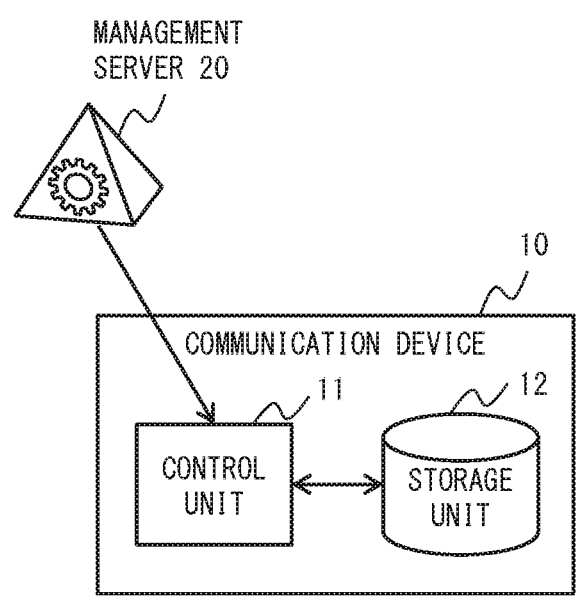
FIG. 1 is a diagram showing a configuration example of a communication system according to a first embodiment.

FIG. 1 shows a configuration example of a communication system according to this embodiment. The communication system shown in FIG. 1 includes a communication device 10 and a management server 20. The communication device 10 is controlled by control software, and includes a control unit 11 and a non-volatile storage unit 12. The management server 20 is a server that is operated by a system administrator, and holds information about the communication device 10.

In the case of updating the control software, the control unit 11 stores information about the communication device 10 in the storage unit 12 before the control software is updated so as to implement ISSU. After updating the control software, the control unit 11 compares the information about the communication device 10 stored in the storage unit 12 with information about the communication device 10 obtained after updating the control software. Note that the information about the communication device 10 obtained after updating the control software can be acquired from the management server 20, or HW (hardware), which is not shown, within the communication device 10. Further, the control unit 11 performs predetermined processing based on the comparison result. Examples of the predetermined processing include processing for determining whether there is an inconsistency in the information obtained before updating the control software and the information obtained after updating the control software, and processing for notifying a system administrator of the determination result.

As described above, in this embodiment, the control unit 11 compares the information obtained before updating the control software with the information obtained after updating the control software, and performs the predetermined processing based on the comparison result. Accordingly, the communication device can perform, for example, processing for determining whether there is an inconsistency in the information obtained before updating the control software and the information obtained after updating the control software, without the need for the system administrator to perform the processing.

Accordingly, even if there is an inconsistency in the information obtained before updating the control software and the information obtained after updating the control software, adverse effects on a continuously operated service can be minimized.

(2) Second Embodiment

Figure 2:
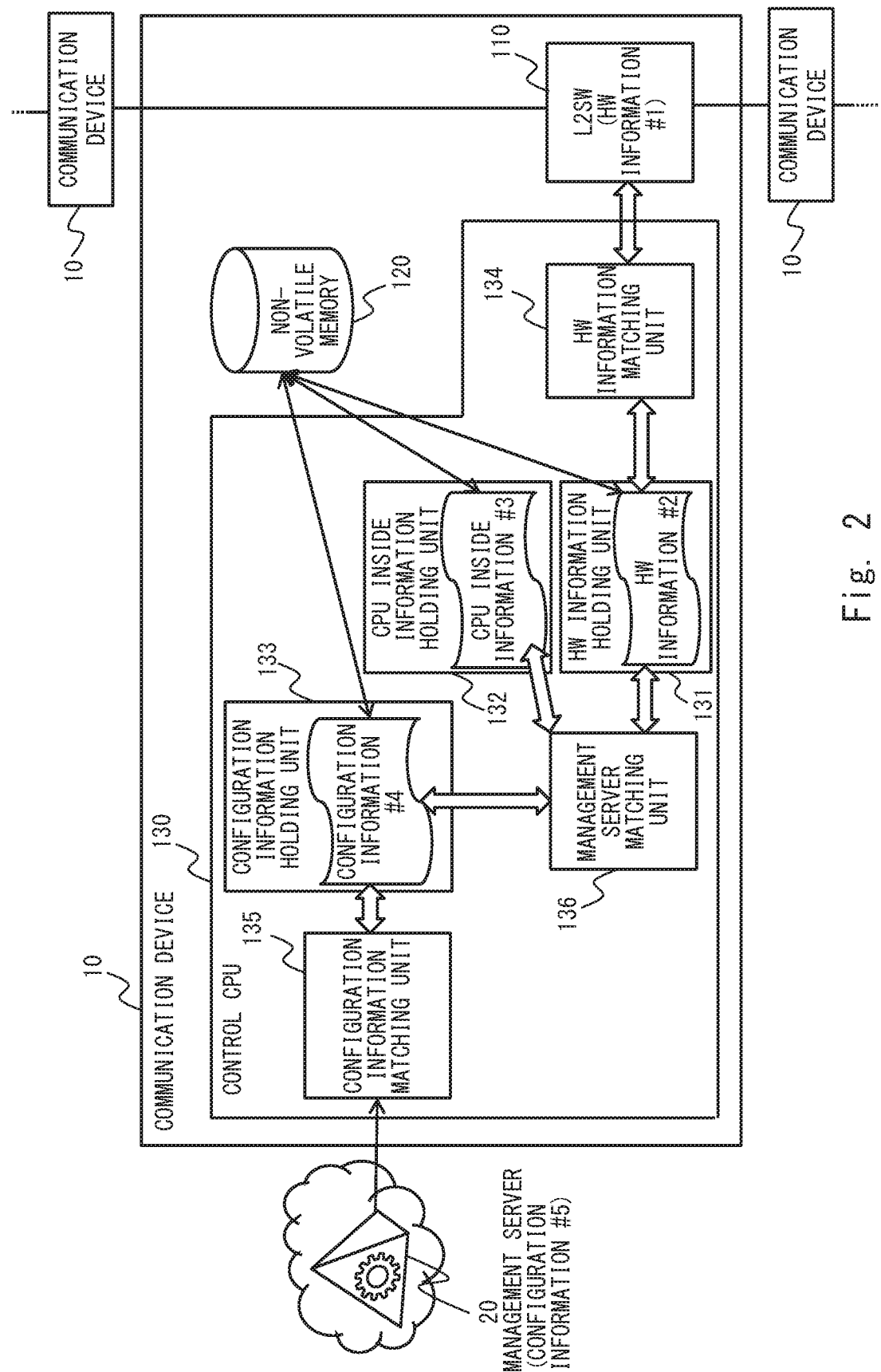
FIG. 2 is a diagram showing a configuration example of a communication system according to a second embodiment.

A second embodiment is a specific example of the configuration and operation of the communication device 10 according to the first embodiment. This embodiment includes an L2SW as HW, and implements an ERP (Ethernet® Ring Protection) function. ERP is a function for implementing loop prevention and redundancy in a ring-type network in which L2SWs are connected in a ring shape. Specifically, in the ERP, a port at one location on the ring is generally brought into a blocking state. If a failure occurs at any one of the ports on the ring, the port in the blocking state is switched to a forwarding state. FIG. 2 shows a configuration example of the communication system according to this embodiment. The communication system shown in FIG. 2 differs from the communication system shown in FIG. 1 in regard to the use of a plurality of communication devices 10 and the configuration of the communication device 10. The communication device 10 includes an L2SW 110 as HW, and a non-volatile memory 120 and a control CPU 130 which respectively correspond to the storage unit 12 and the control unit 11 shown in FIG. 1. The control CPU 130 includes an HW information holding unit 131, a CPU inside information holding unit 132, a configuration information holding unit 133, an HW information matching unit 134, a configuration information matching unit 135, and a management server matching unit 136.

The management server 20 is a server that is operated by a system administrator, and configures a setting for the L2SW 110 and a setting for the ERP implemented using the L2SW 110. The setting for the ERP is performed on the control CPU 130. The management server 20 holds configuration information indicating a setting content set for the L2SW 110 and a setting content set for the ERP. The configuration information held by the management server 20 is hereinafter referred to as configuration information #5 (first configuration information). The L2SW 110 holds HW information indicating a setting content set for the L2SW 110 by the management server 20 and a current state of the L2SW 110. The HW information held by the L2SW 110 is hereinafter referred to as HW information #1 (first HW information).

The HW information holding unit 131 acquires the HW information from the L2SW 110 and holds the acquired HW information. The HW information held by the HW information holding unit 131 is hereinafter referred to as HW information #2 (second HW information). The configuration information holding unit 133 acquires the configuration information from the management server 20 and holds the acquired configuration information. The configuration information held by the configuration information holding unit 133 is hereinafter referred to as configuration information #4 (second configuration information). The CPU inside information holding unit 132 holds CPU inside information indicating a current state of the ERP, and transmits the CPU inside information to another communication device 10 and receives the CPU inside information therefrom. The ERP is implemented by transmitting or receiving the CPU inside information. The CPU inside information held by the CPU inside information holding unit 132 is hereinafter referred to as CPU inside information #3. The HW information holding unit 131, the CPU inside information holding unit 132, and the configuration information holding unit 133, which implement the ISSU when the control software is updated, store the information held therein in the non-volatile memory 120 before the control software is updated, and acquires the information from the non-volatile memory 120 and holds the acquired information after the control software is updated.

The HW information matching unit 134 acquires the HW information #1 from the L2SW 110 after the control software is updated, and determines whether there is a consistency between the HW information #1 and the HW information #2 acquired from the non-volatile memory 120 (check process 1). In the check process 1, when the HW information #1 matches the HW information #2, it is determined that there is a consistency between the HW information #1 and the HW information #2. The configuration information matching unit 135 acquires the configuration information #5 from the management server 20 after the control software is updated, and determines whether there is a consistency between the configuration information #5 and the configuration information #4 acquired from the non-volatile memory 120 (check process 2). In the check process 2, when the configuration information #4 matches the configuration information #5, it is determined that there is a consistency between the configuration information #4 and the configuration information #5. After the control software is updated, the management server matching unit 136 determines whether there is a consistency among the HW information #2, the CPU inside information #3, and the configuration information #4 acquired from the non-volatile memory 120 (check process 3). FIG. 3 shows an example of an internal control table according to this embodiment. In the internal control table, patters 1 to 4 of combinations of the state (LinkStatus) of the L2SW 110, the configuration information (PortEnable/ERPEnable), and the CPU inside information (ERPStatus) having a consistency are registered. In the check process 3, when a pattern of combinations of the state (LinkStatus) of the L2SW 110 indicated by the HW information #2 and the configuration information #4 (PortEnable/ERPEnable) is registered in the internal control table, the management server matching unit 136 determines that there is a consistency among the HW information #2, the CPU inside information #3, and the configuration information #4. On the other hand, when a pattern of combinations of the state (LinkStatus) of the L2SW 110 indicated by the HW information #2 and the configuration information #4 (PortEnable/ERPEnable) is not registered in the internal control table, the management server matching unit 136 determines that there is no consistency among the HW information #2, the CPU inside information #3, and the configuration information #4. Note that LinkStatus, ERPStatus, PortEnable, and ERPEnable will be described later. Further, the management server matching unit 136 determines where there is an inconsistency in any one of the HW information #2, the inside information #3, and the configuration information #4 based on the result of the determination as to the consistency in the check processes 1, 2, and 3. When there is an inconsistency, the information including the inconsistency among the HW information #2, the inside information #3, and the configuration information #4 is corrected.

The HW information #1 and the HW information #2, the CPU inside information #3, and the configuration information #4 and the configuration information #5 in this embodiment will be described in detail below.

The HW information #1 and the HW information #2 are information indicating a setting content (for example, PortEnable) set to the L2SW 110 by the management server 20 and the current state (for example, LinkStatus) of the L2SW 110. PortEnable indicates that the setting content of the port of the L2SW 110 is enable or disable, and indicates a value of Enable or Disable. LinkStatus indicates that the link state of the port of the L2SW 110 is a link-up state or a link-down state, and indicates a value of Up or Down. The HW information #1 and the HW information #2 are each defined by a register and bits in and address space. The register has two types, i.e., a readable/writable setting system and a readable status system. In the register of the setting system, for example, the above-mentioned PortEnable is defined, in the register of the status system, for example, the above-mentioned LinkStatus is defined.

The CPU inside information #3 is information indicates the current state (for example, ERPStatus) of the ERP implemented using the L2SW 110. ERPStatus indicates that the link state of the port of the L2SW 110 used by the ERP is one of a link-up state, a link-down state, and an unavailable state, and has a value of one of Up, Down, and NA (Not Available). The CPU inside information #3 corresponds to, for example, a protocol internal table.

The configuration information #4 and the configuration information #5 are each information indicating the setting content (for example, PortEnable) set to the L2SW 110 by the management server 20 and the setting content (for example, ERPEnable) set to the ERP by the management server 20. ERPEnable indicates that the setting content of the ERP represents enable or disable, has a value of Enable or Disable. ERPEnable indicates the port used when the ERP is enabled. The configuration information #4 and the configuration information #5 include two types, i.e., information which is confirmed in a text form by a user, such as MIB (Management Information Base) and CLI (Command Line Interface), and information which is confirmed by a user using a tool, such as binary data. This embodiment assumes MIB.

Factors for causing an inconsistency in the HW information #1, the HW information #2, the CPU inside information #3, the configuration information #4, and the configuration information #5 after the control software is updated will be described below.

The communication device 10 according to this embodiment acquires the information (HW information #2, CPU inside information #3, and configuration information #4), which is stored in the non-volatile memory 120 before the control software is updated, from the non-volatile memory 120 after the control software is updated, acquires the HW information #1 from the L2SW 110, and acquires the configuration information #5 from the management server 20. However, an inconsistency may occur in the HW information #1 acquired from the L2SW 110, the information (HW information #2, CPU inside information #3, and configuration information #4) acquired from the non-volatile memory 120, and the configuration information #5 acquired from the management server 20. The inconsistency is caused by, for example, the following factors.

Factor 1: There is a consistency between the HW information #1 acquired from the L2SW 110 and the configuration information #5 acquired from the management server 20, and there is no consistency among the HW information #1, the configuration information #5, and the information (HW information #2, CPU inside information #3, and configuration information #4) acquired from the non-volatile memory 120. This event may occur, for example, when the configuration information #1 is changed after the information (HW information #2, CPU inside information #3, and configuration information #4) is stored in the non-volatile memory 120. In this case, there is a consistency between the HW information #1 acquired from the L2SW 110 and the configuration information #5 acquired from the management server 20, but the information (HW information #2, CPU inside information #3, and configuration information #4) acquired from the non-volatile memory 120 is old.

Factor 2: There is no consistency between the HW information #1 acquired from the L2SW 110 and the HW information #2 acquired from the non-volatile memory 120. This event may occur, for example, when a C-Plane protocol (ERP or xSTPP) autonomously changes the setting for the L2SW 110 after the HW information #2 is stored in the non-volatile memory 120.

Factor 3: There is no consistency between the configuration information #5 acquired from the management server 20 and the configuration information #4 acquired from the non-volatile memory 120. This event may occur, for example, when a control terminal or the like other than the management server 20 changes the setting for the L2SW 110 without involving the control CPU 130.

Factor 4: There is no consistency among the HW information #2, the CPU inside information #3, and the configuration information #4 acquired from the non-volatile memory 120. This event may occur, for example, when the information (HW information #2, CPU inside information #3, and configuration information #4) is stored in the non-volatile memory 120 during a transition period (during updating of HW information #2, CPU inside information #3, and configuration information #4) of the control CPU 130 along with updating of FW (FirmWare) in the L2SW 110.

After the control software is updated, if there is an inconsistency in the acquired information (HW information #2, CPU inside information #3, and configuration information #4) acquired from the non-volatile memory 120, in accordance with the occurrence status of the factors described above, the communication device 10 according to this embodiment corrects the information including the inconsistency.

The operation of the communication device 10 according to this embodiment will be described below.

Figure 4:
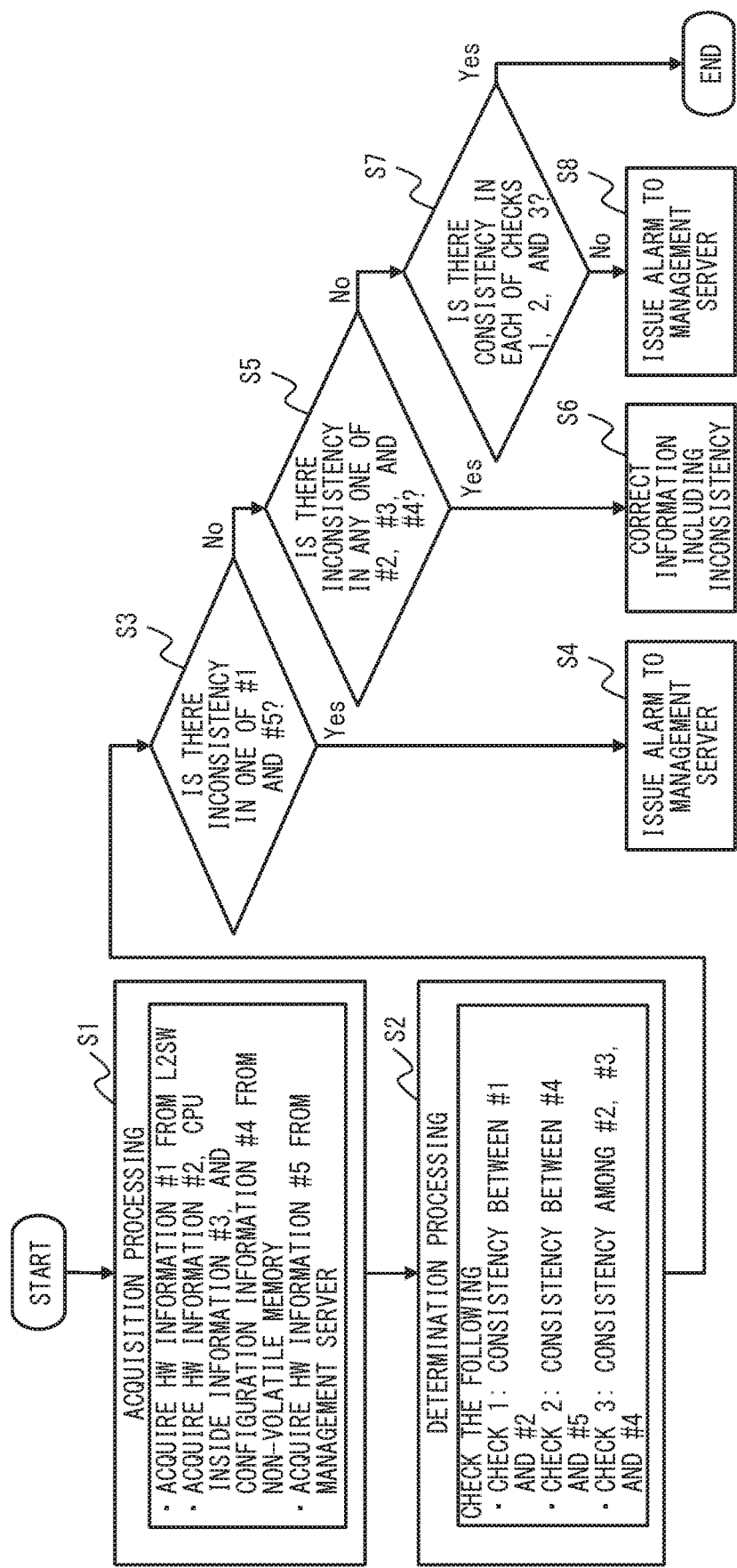
FIG. 4 is a flowchart showing an example of an operation of a communication device according to the second embodiment.

FIG. 4 shows the operation of the communication device 10 according to this embodiment after the control software is updated. Assume herein that, before the control software is updated, the HW information #2, the CPU inside information #3, and the configuration information #4 which are held in the control CPU 130 are stored in the non-volatile memory 120. Referring to FIG. 4, the control CPU 130 first performs processing for acquiring various pieces of information (step S1). Specifically, in the control CPU 130, the HW information holding unit 131 acquires the HW information #2 from the non-volatile memory 120; the CPU inside information holding unit 132 acquires the CPU inside information #3 from the non-volatile memory 120; and the configuration information holding unit 133 acquires the configuration information #4 from the non-volatile memory 120. Further, the HW information matching unit 134 acquires the HW information #1 from the L2SW 110, and the configuration information matching unit 135 acquires the configuration information #5 from the management server 20.

Next, the control CPU 130 performs determination processing for determining whether there is an inconsistency in any one of the HW information #1, the HW information #2, the inside information #3, the configuration information #4, and the configuration information #5 (step S2). Specifically, in the control CPU 130, the HW information matching unit 134 determines whether there is a consistency between the HW information #1 acquired from the L2SW 110 and the HW information #2 acquired from the non-volatile memory 120 (check process 1). If the HW information #1 matches the HW information #2, the check process 1 determines that there is a consistency between the HW information #1 and the HW information #2. The configuration information matching unit 135 determines whether there is a consistency between the configuration information #5 acquired from the management server 20 and the configuration information #4 acquired from the non-volatile memory 120 (check process 2). In the check process 2, if the configuration information #4 matches the configuration information #5, it is determined that there is a consistency between the configuration information #4 and the configuration information #5. The management server matching unit 136 refers to the internal control table shown in FIG. 3, and determines whether there is a consistency among the HW information #2, the CPU inside information #3, and the configuration information #4 acquired from the non-volatile memory 120 (check process 3). In the check process 3, when a pattern of combinations of the state of the L2SW 110 indicated by the HW information #2, the CPU inside information #3, and the configuration information #4 is registered in the internal control table, the management server matching unit 136 determines that there is a consistency among the HW information #2, the CPU inside information #3, and the configuration information #4. Further, the management server matching unit 136 determines whether there is an inconsistency in any one of the HW information #1, the HW information #2, the CPU inside information #3, the configuration information #4, and the configuration information #5 based on the result of the determination as to the consistency in the check processes 1, 2, and 3. This determination method is, for example, as follows.

In the check process 1, when the consistency is not obtained and when there is a consistency in the check process 2 and there is no consistency in the check process 3, it is determined that there is an inconsistency in the configuration information #2.

When there is no consistency in the check process 1; there is a consistency in the check process 2; and there is a consistency in the check process 3, it is determined that there is an inconsistency in the configuration information #1.

When there is a consistency in the check process 1; there is no consistency in the check process 2; and there is no consistency in the check process 3, it is determined that there is an inconsistency in the HW information #4.

When there is a consistency in the check process 1; there is no consistency in the check process 2; and there is a consistency in the check process 3, it is determined that there is an inconsistency in the HW information #5.

When there is a consistency in the check process 1; there is a consistency in the check process 2; and there is no consistency in the check process 3, it is determined that there is an inconsistency in the CPU inside information #3.

Cases other than the above-mentioned cases will be described later.

When there is an inconsistency in one of the HW information #1 acquired from the L2SW 110 and the configuration information #5 acquired from the management server 20 (Yes in step S3), the management server matching unit 136 transmits an alarm to the management server 20 (step S4).

When the management server matching unit 136 determines that there is an inconsistency in any one of the configuration information #2, the CPU inside information #3, and the HW information #4 acquired from the non-volatile memory 120 (Yes in step S5), the management server matching unit 136 corrects the information including the inconsistency (step S6).

When there is a consistency in each of the check processes 1, 2, and 3 (Yes in step S7), the management server matching unit 136 terminates the processing. In the other cases (No in step S7), the management server matching unit 136 transmits an alarm to the management server 20 (step S8). Examples of the other cases include a case where there is a consistency between the HW information #1 and the configuration information #5 and there is no consistency among the HW information #1, the configuration information #5, and the information (HW information #2, CPU inside information #3, and configuration information #4) acquired from the non-volatile memory 120.

The determination processing in step S2 shown in FIG. 4 will be described below with reference to specific examples.

(A) Specific Example 1

Figure 5:
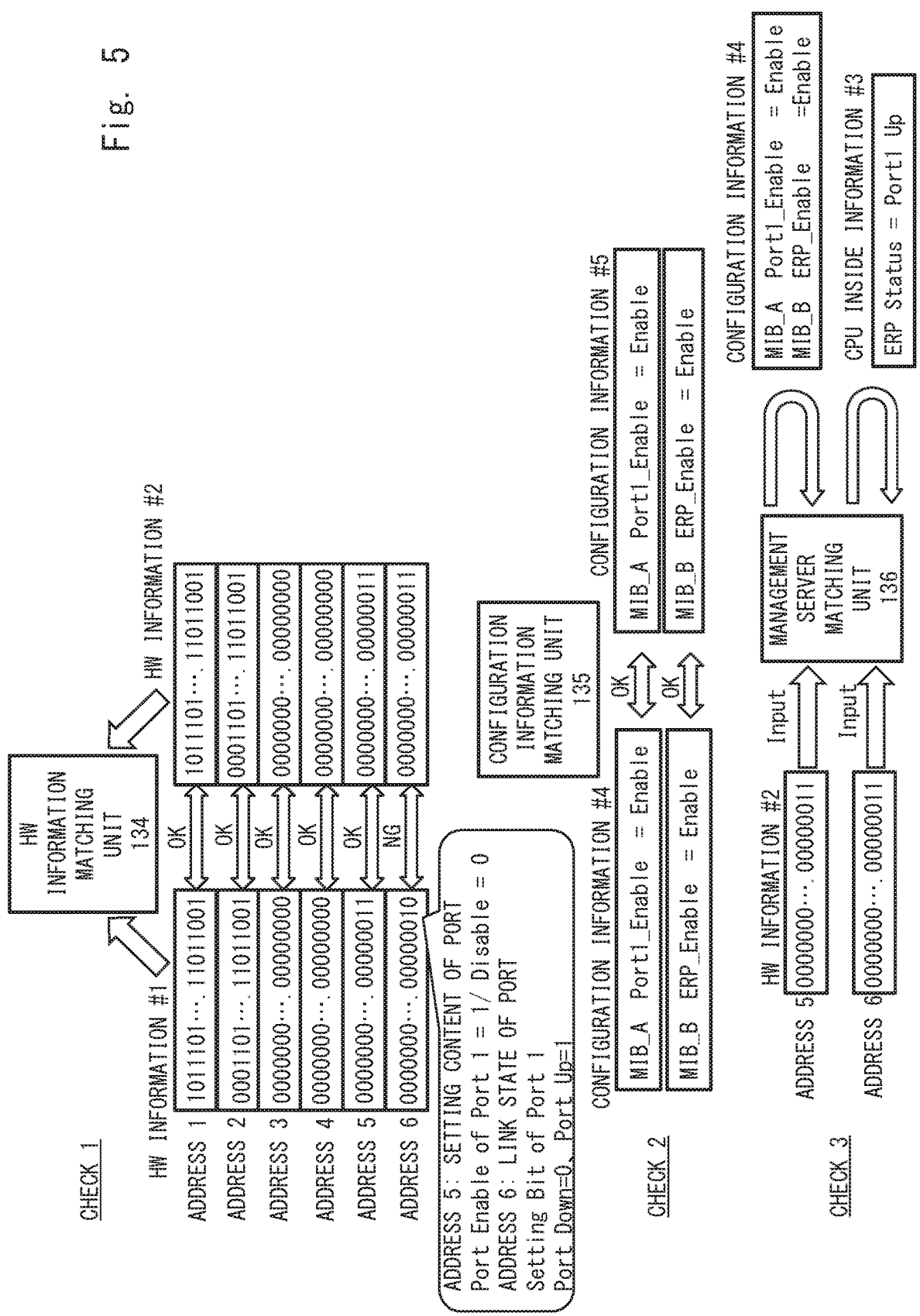
FIG. 5 is a diagram showing Specific Example 1 of determination processing in step S2 shown in FIG. 4.

FIG. 5 shows Specific Example 1 of determination processing in step S2. FIG. 6 shows states of the HW information #1, the HW information #2, the CPU inside information #3, the configuration information #4, and the configuration information #5 in Specific Example 1. Note that in FIG. 5, each bit of an address 5 in the HW information #1 and the HW information #2 represents a setting content of each port of the L2SW 110, and a least significant bit of the address 5 represents a setting content of a port 1. Each bit of an address 6 in the HW information #1 and the HW information #2 represents a link state of each port of the L2SW 110, and a least significant bit of the address 6 represents a link state of the port 1 (the same holds true for FIGS. 7, 9, 11, and 13).

Check process 1: The HW information matching unit 134 determines whether there is a consistency between the HW information #1 and the HW information #2. As a result, the HW information matching unit 134 determines that the HW information #1 and the HW information #2 do not match in the least significant bit of the address 6, i.e., LinkStatus representing the link state of the port 1 of the L2SW 110, and thus determines that there is no consistency between the HW information #1 and the HW information #2.

Check process 2: The configuration information matching unit 135 determines whether there is a consistency between the configuration information #4 and the configuration information #5. As a result, the configuration information matching unit 135 determines that the configuration information #4 matches the configuration information #5, and thus determines that there is a consistency between the configuration information #4 and the configuration information #5.

Check process 3: The management server matching unit 136 refers to the internal control table shown in FIG. 3, and confirms that the value of LinkStatus is determined by MIB_A (Port1_Enable) and MIB_B (ERP_Enable) of the configuration information #4 and ERP_Status of the CPU inside information #3. In this case, LinkStatus of the HW information #2=Up; Port1_Enable of the configuration information #4=Enable1; ERP_Enable=Enable of the configuration information #4; and ERP_Status of the CPU inside information #3=Up. The pattern of these combinations corresponds to the pattern 1 in the internal control table shown in FIG. 3. As a result, the management server matching unit 136 determines that there is a consistency among the HW information #2, the CPU inside information #3, and the configuration information #4.

On the basis of the results of the determination as to the consistency in the check processes 1, 2, and 3 described above, the management server matching unit 136 determines that there is an inconsistency in the HW information #1. In this case, since ERP_Status of the CPU inside information #3=Up, there is a possibility that, for example, the HW information #1 has changed after the HW information #2 and the configuration information #3 are stored in the non-volatile memory 120. Accordingly, the management server matching unit 136 transmits an alarm indicating that the HW information #1 does not match the HW information #2 to the management server 20.

(B) Specific Example 2

Figure 7:
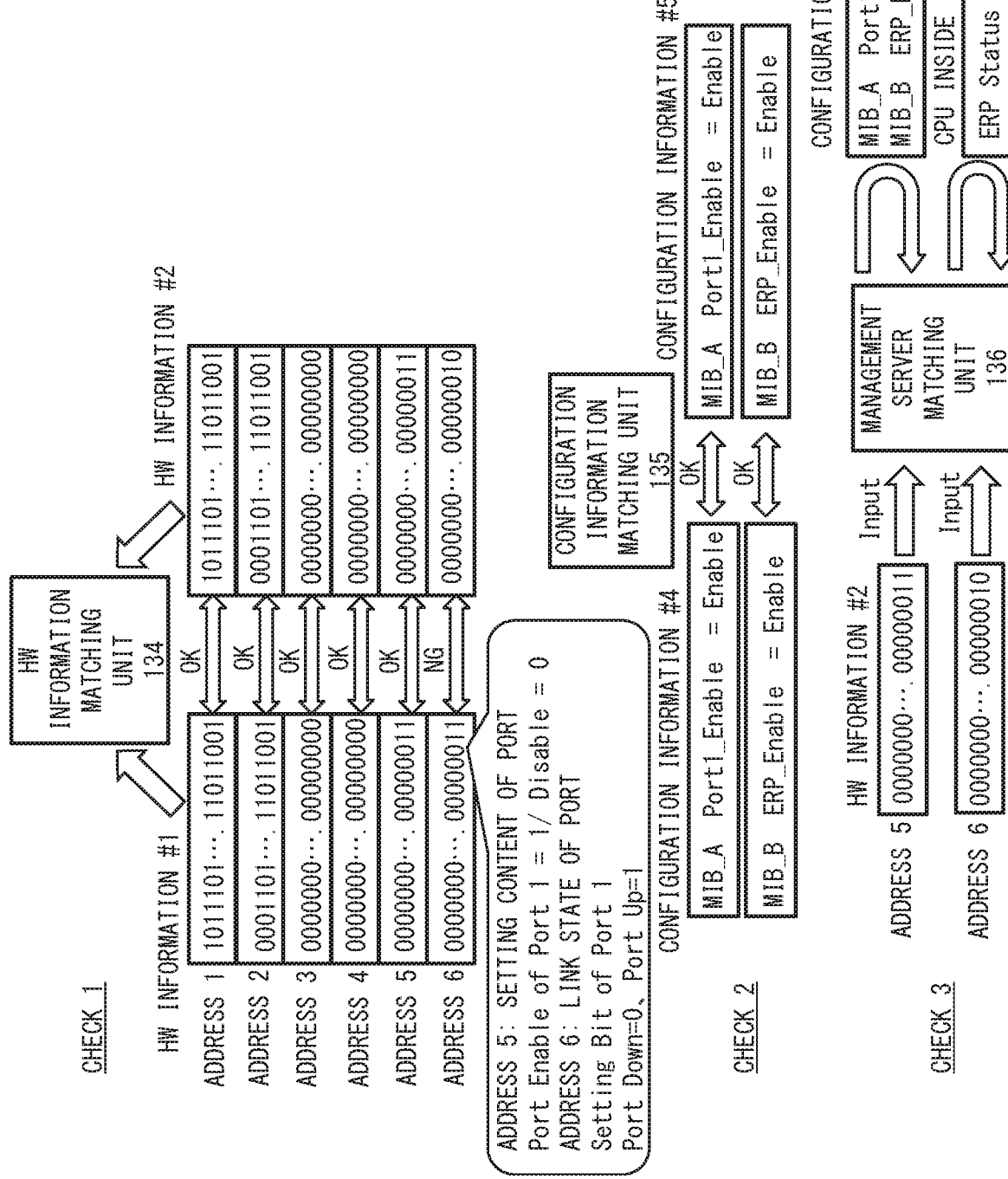
FIG. 7 is a diagram showing Specific Example 2 of determination processing in step S2 shown in FIG. 4.

FIG. 7 shows Specific Example 2 of determination processing in step S2. FIG. 8 shows states of HW information #1 and the HW information #2, CPU inside information #3, and configuration information #4 and the configuration information #5 in Specific Example 2.

Check process 1: The HW information matching unit 134 determines whether there is a consistency between the HW information #1 and the HW information #2. As a result, the HW information matching unit 134 determines that the HW information #1 and the HW information #2 do not match in the least significant bit of the address 6, i.e., LinkStatus representing the link state of the port 1 of the L2SW 110, and thus determines that there is no consistency between the HW information #1 and the HW information #2.

Check process 2: The configuration information matching unit 135 determines whether there is a consistency between the configuration information #4 and the configuration information #5. As a result, the configuration information matching unit 135 determines that the configuration information #4 matches the configuration information #5, and thus determines that there is a consistency between the configuration information #4 and the configuration information #5.

Check process 3: The management server matching unit 136 refers to the internal control table shown in FIG. 3, and confirms that the value of LinkStatus is determined by MIB_A (Port1_Enable) and MIB_B (ERP_Enable) of the configuration information #4 and ERP_Status of the CPU inside information #3. In this case, LinkStatus of the HW information #2=Down; Port1_Enable of the configuration information #4=Enable; ERP_Enable of the configuration information #4=Enable; and ERP_Status of the CPU inside information #3=Up. The pattern of these combinations is not registered in the internal control table shown in FIG. 3. As a result, the management server matching unit 136 determines that there is no consistency among the HW information #2, the CPU inside information #3, and the configuration information #4.

On the basis of the results of the determination as to the consistency in the check processes 1, 2, and 3 described above, the management server matching unit 136 determines that there is an inconsistency in the HW information #2. In this case, there is a possibility that, for example, a bit error has occurred in the HW information #2 at the time of storing the information in the non-volatile memory 120. Accordingly, the management server matching unit 136 corrects the HW information #2 including the inconsistency, without transmitting an alarm to the management server 20.

(C) Specific Example 3

Figure 9:
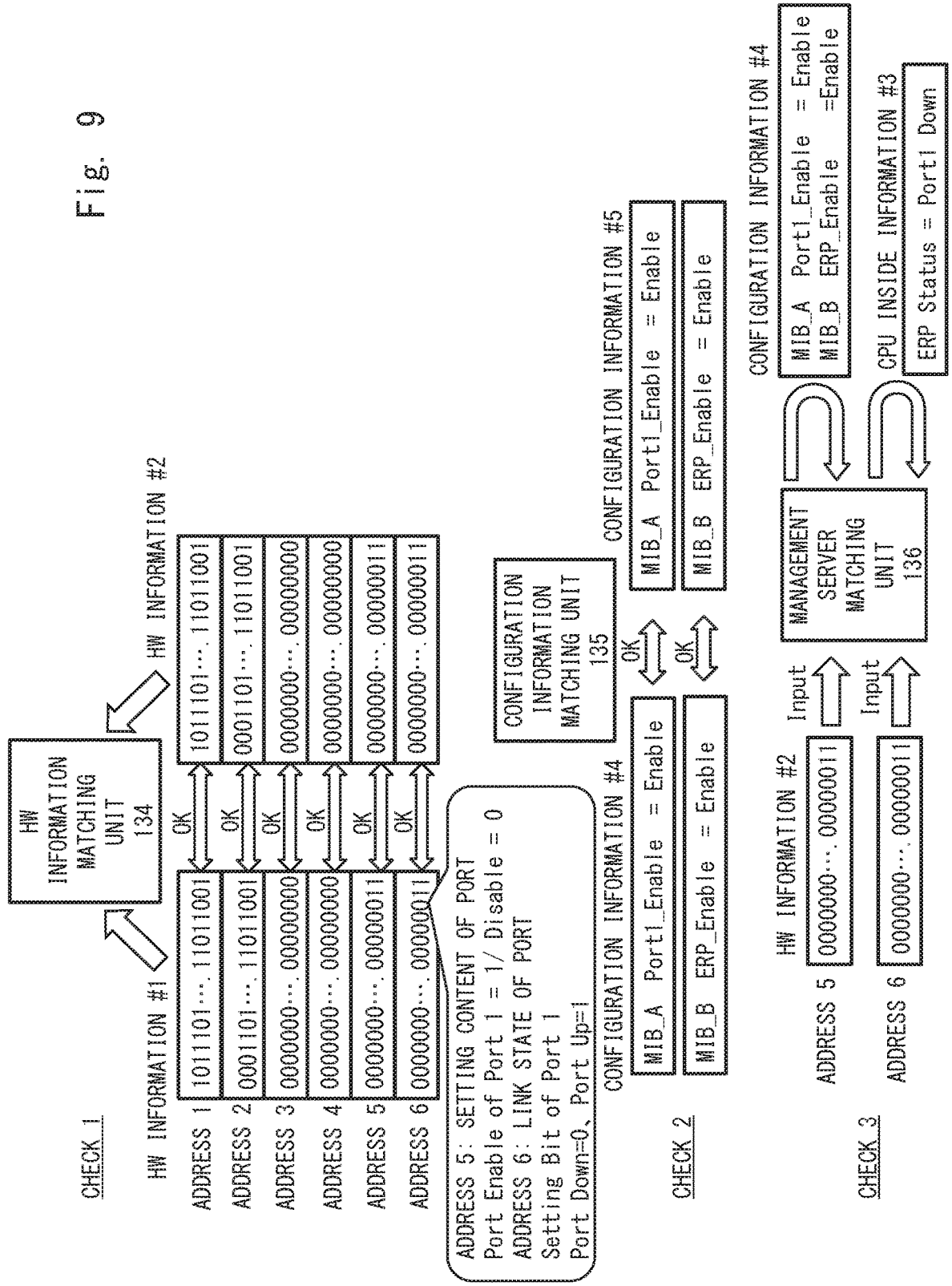
FIG. 9 is a diagram showing Specific Example 3 of determination processing in step S2 shown in FIG. 4.

FIG. 9 shows Specific Example 3 of determination processing in step S2. FIG. 10 shows states of the HW information #1, the HW information #2, the CPU inside information #3, the configuration information #4, and the configuration information #5 in Specific Example 3.

Check process 1: The HW information matching unit 134 determines whether there is a consistency between the HW information #1 and the HW information #2. As a result, the HW information matching unit 134 determines that the HW information #1 matches the HW information #2, and thus determines that there is a consistency between the HW information #1 and the HW information #2.

Check process 2: The configuration information matching unit 135 determines whether there is a consistency between the configuration information #4 and the configuration information #5. As a result, the configuration information matching unit 135 determines that the configuration information #4 matches the configuration information #5, and thus determines that there is a consistency between the configuration information #4 and the configuration information #5.

Check process 3: The management server matching unit 136 refers to the internal control table shown in FIG. 3, and confirms that the value of LinkStatus is determined by MIB_A (Port1_Enable) and MIB_B (ERP_Enable) of the configuration information #4 and ERP_Status of the CPU inside information #3. In this case, LinkStatus of the HW information #2=Up; Port1_Enable of the configuration information #4=Enable; ERP_Enable of the configuration information #4=Enable; and ERP_Status of the CPU inside information #3=Down. The pattern of these combinations is not registered in the internal control table shown in FIG. 3. As a result, the management server matching unit 136 determines that there is no consistency among the HW information #2, the CPU inside information #3, and the configuration information #4.

On the basis of the results of the determination as to the consistency in the check processes 1, 2, and 3 described above, the management server matching unit 136 determines that there is an inconsistency in the CPU inside information #3. In this case, there is a possibility that, for example, a bit error has occurred in the CPU inside information #3 at the time of storing the information in the non-volatile memory 120. Accordingly, the management server matching unit 136 corrects the CPU inside information #3 including the inconsistency, without transmitting an alarm to the management server 20.

(D) Specific Example 4

Figure 11:
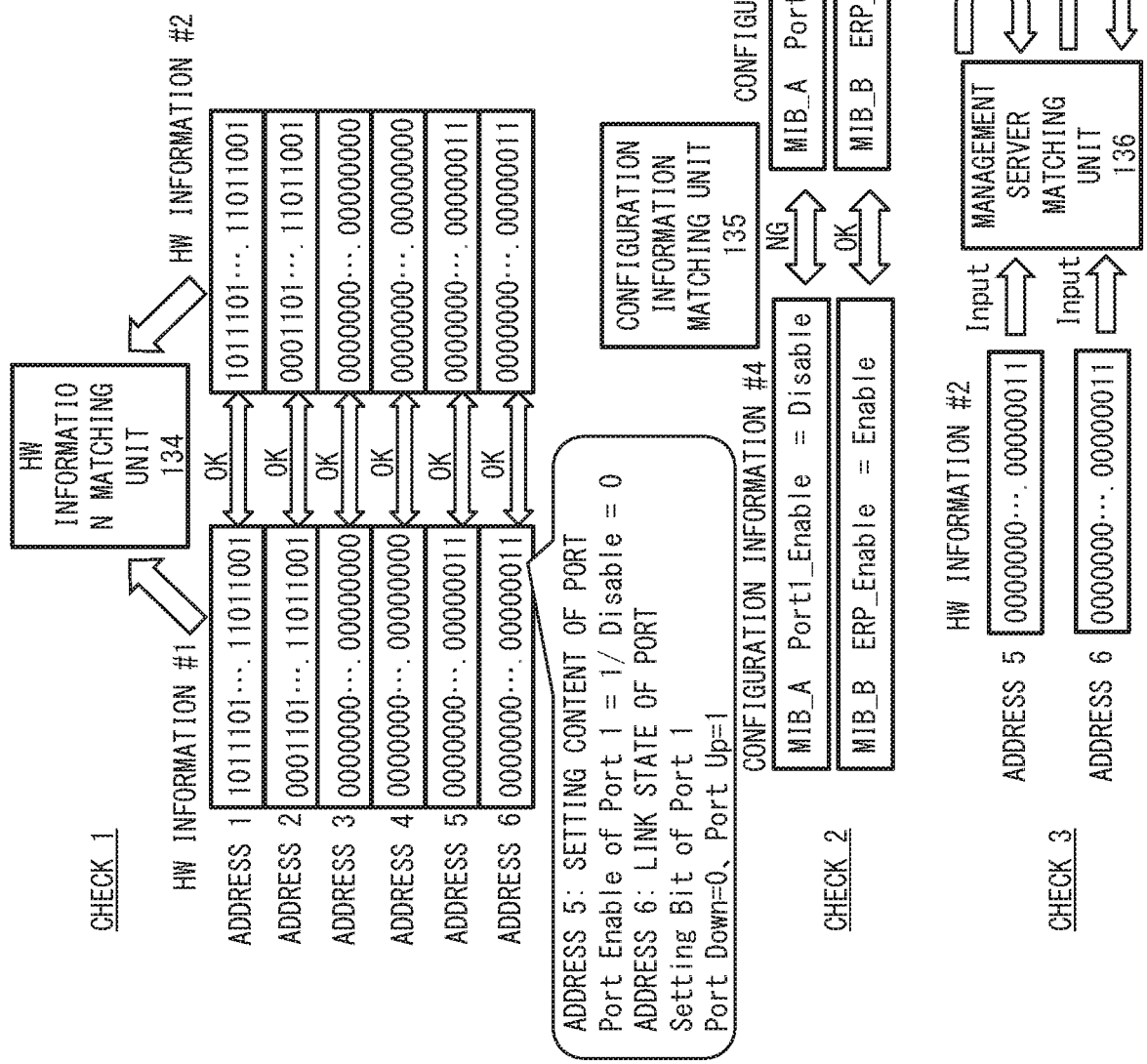
FIG. 11 is a diagram showing Specific Example 4 of determination processing in step S2 shown in FIG. 4.

FIG. 11 shows Specific Example 4 of determination processing in step S2. FIG. 12 shows states of HW information #1 and the HW information #2, CPU inside information #3, and configuration information #4 and the configuration information #5 in Specific Example 4.

Check process 1: The HW information matching unit 134 determines whether there is a consistency between the HW information #1 and the HW information #2. As a result, the HW information matching unit 134 determines that the HW information #1 matches the HW information #2, and thus determines that there is a consistency between the HW information #1 and the HW information #2.

Check process 2: The configuration information matching unit 135 determines whether there is a consistency between the configuration information #4 and the configuration information #5. As a result, the configuration information matching unit 135 determines that the configuration information #4 and the configuration information #5 do not match in MIB_A (Port1_Enable), and thus determines that there is no consistency between the configuration information #4 and the configuration information #5.

Check process 3: The management server matching unit 136 refers to the internal control table shown in FIG. 3, and confirms that the value of LinkStatus is determined by MIB_A (Port1_Enable) and MIB_B (ERP_Enable) of the configuration information #4 and ERP_Status of the CPU inside information #3. In this case, LinkStatus of the HW information #2=Up; Port1_Enable of the configuration information #4=Disable; ERP_Enable of the configuration information #4=Enable; and ERP_Status of the CPU inside information #3=Up. The pattern of these combinations is not registered in the internal control table shown in FIG. 3. As a result, the management server matching unit 136 determines that there is no consistency among the HW information #2, the CPU inside information #3, and the configuration information #4.

On the basis of the results of the determination as to the consistency in the check processes 1, 2, and 3 described above, the management server matching unit 136 determines that there is an inconsistency in the configuration information #4. In this case, there is a possibility that, for example, a bit error has occurred in the configuration information #4 at the time of storing the information in the non-volatile memory 120. Accordingly, the management server matching unit 136 corrects the configuration information #4 including the inconsistency, without transmitting an alarm to the management server 20.

(E) Specific Example 5

Figure 13:
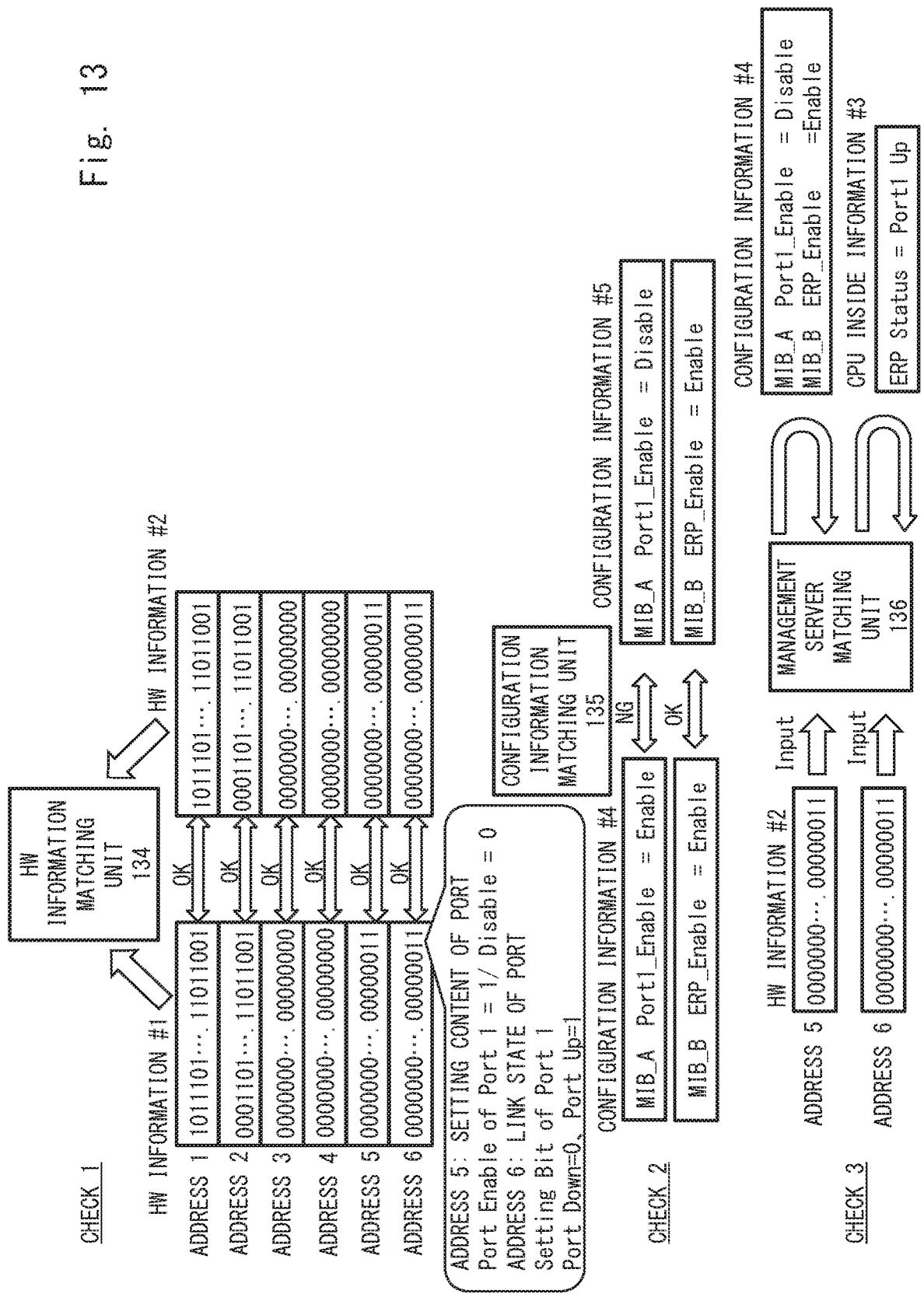
FIG. 13 is a diagram showing Specific Example 5 of determination processing in step S2 shown in FIG. 4.

FIG. 13 shows Specific Example 5 of the determination processing in step S2. FIG. 14 shows states of the HW information #1 and the HW information #2, the CPU inside information #3, and the configuration information #4 and the configuration information #5 in Specific Example 5.

Check process 1: The HW information matching unit 134 determines whether there is a consistency between the HW information #1 and the HW information #2. As a result, the HW information matching unit 134 determines that the HW information #1 matches the HW information #2, and thus determines that there is a consistency between the HW information #1 and the HW information #2.

Check process 2: The configuration information matching unit 135 determines whether there is a consistency between the configuration information #4 and the configuration information #5. As a result, the configuration information matching unit 135 determines that the configuration information #4 and the configuration information #5 do not match in MIB_A (Port1_Enable), and thus determines that there is no consistency between the configuration information #4 and the configuration information #5.

Check process 3: The management server matching unit 136 refers to the internal control table shown in FIG. 3, and confirms that the value of LinkStatus is determined by MIB_A (Port1_Enable) and MIB_B (ERP_Enable) of the configuration information #4 and ERP_Status of the CPU inside information #3. In this case, LinkStatus of the HW information #2=Up; Port1_Enable of the configuration information #4=Enable; ERP_Enable of the configuration information #4=Enable; and ERP_Status of the CPU inside information #3=Up. The pattern of these combinations corresponds to the pattern 1 in the internal control table shown in FIG. 3. As a result, the management server matching unit 136 determines that there is consistency among the HW information #2, the CPU inside information #3, and the configuration information #4.

On the basis of the results of the determination as to the consistency in the check processes 1, 2, and 3 described above, the management server matching unit 136 determines that there is an inconsistency in the configuration information #5. Accordingly, the management server matching unit 136 transmits an alarm indicating that the configuration information #5 does not match configuration information #4 to the management server 20.

As described above, in this embodiment, when there is an inconsistency in any one of the HW information #2, the CPU inside information #3, and the configuration information #4 acquired from the non-volatile memory 120 after the control software is updated, the control CPU 130 corrects the information including the inconsistency among the HW information #2, the CPU inside information #3, and the configuration information #4, without transmitting an alarm to the management server 20. Accordingly, there is no need to stop a currently operated service, and the service can be continued.

Accordingly, even when there is an inconsistency in any one of the HW information #2, the CPU inside information #3, and the configuration information #4, which are held in the control CPU 130, after the control software is updated, adverse effects on a continuously operated service can be minimized.

While the present invention has been described above with reference to the embodiments, the present invention is not limited to the above embodiments. The configuration and details of the present invention can be modified in various ways that can be understood by those skilled in the art within the scope of the present invention.

For example, the above embodiments illustrate an example in which the network in which the L2SW is disposed is a ring-type network. However, the network is not limited to a ring-type network.

While the above embodiments illustrate an example in which the L2SW is used as HW, the HW is not limited to the L2SW. The HW is not particularly limited as long as the HW can be set from the management server. For example, FPGA (Field Programmable Gate Array) may also be used.

This application is based upon and claims the benefit of priority from Japanese patent application No. 2015-020985, filed on Feb. 5, 2015, the disclosure of which is incorporated herein in its entirety by reference.

REFERENCE SIGNS LIST

10 COMMUNICATION DEVICE
11 CONTROL UNIT
12 STORAGE UNIT
110 L2SW
120 NON-VOLATILE MEMORY
130 CONTROL CPU
131 HW INFORMATION HOLDING UNIT
132 CPU INSIDE INFORMATION HOLDING UNIT
133 CONFIGURATION INFORMATION HOLDING UNIT
134 HW INFORMATION MATCHING UNIT
135 CONFIGURATION INFORMATION MATCHING UNIT
136 MANAGEMENT SERVER MATCHING UNIT
20 MANAGEMENT SERVER

What is claimed is:

1. A communication system comprising:
a communication device to be controlled by control software; and
a management server configured to hold information about the communication device, wherein
the communication device stores the information about the communication device before updating the control software,
the communication device compares, after updating the control software, the stored information about the communication device with information about the communication device obtained after updating the control software, and performs predetermined processing based on a result of the comparison,
the communication device includes hardware, a storage unit, and a control unit,
the management server configures a setting for the hardware and a setting for a function implemented using the hardware, and holds, as first configuration information, configuration information indicating a setting content of the setting for the hardware and a setting content for the setting for the function,
the hardware holds, as first hardware information, hardware information indicating a setting content of the hardware set by the management server and a state of the hardware,
the control unit acquires the first configuration information from the management server and the first hardware information from the hardware, holds the acquired first configuration information and the acquired first hardware information as second configuration information and second hardware information, respectively, and holds inside information indicating a state of the function, the control unit stores, before updating the control software, the second hardware information, the inside information, and the second configuration information in the storage unit, the second hardware information, the inside information, and the second configuration information being held by the control unit, the control unit acquires, after updating the control software, the second hardware information, the inside information, and the second configuration information from the storage unit, the first hardware information from the hardware, and the first configuration information from the management server, determines whether there is a consistency between the pieces of acquired information, determines, based on a result of the determination as to the consistency, whether there is an inconsistency in any one of the second hardware information, the inside information, and the second configuration information acquired from the storage unit, and corrects, when there is an inconsistency, information including the inconsistency among the second hardware information, the inside information, and the second configuration information acquired from the storage unit, and the control unit performs, after updating the control software, a first check process for determining a consistency between the first hardware information acquired from the hardware and the second hardware information acquired from the storage unit, a second check process for determining a consistency between the first configuration information acquired from the management server and the second configuration information acquired from the storage unit, and a third check process for determining a consistency among the second hardware information, the inside information, and the second configuration information acquired from the storage unit, and determines, based on a result of the determination as to the consistency in the first, second, and third check processes, whether there is an inconsistency in any of the second hardware information, the inside information, and the second configuration information acquired from the storage unit.

2. The communication system according to claim 1, wherein the control unit includes a table in which a pattern of combinations of the state of hardware, the second configuration information, and the inside information having a consistency is registered, in the first check process, when the first hardware information acquired from the hardware matches the second hardware information acquired from the storage unit, the control unit determines that there is a consistency between the first hardware information and the second hardware information, in the second check process, when the first configuration information acquired from the management server matches the second configuration information acquired from the storage unit, the control unit determines that there is a consistency between the first configuration information and the second configuration information, in the third check process, when a pattern of combinations of the state of the hardware indicated by the second hardware information acquired from the storage unit and the second configuration information and the inside information acquired from the storage unit is registered in the table, the control unit determines that there is a consistency among the second hardware information, the inside information, and the second configuration information acquired from the storage unit.

3. The communication system according to claim 1, wherein when the control unit determines that there is no consistency in the first check process, determines that there is a consistency in the second check process, and determines that there is a consistency in the third check process, the control unit determines that there is an inconsistency in the second hardware information acquired from the storage unit and corrects the second hardware information.

4. The communication system according to claim 1, wherein when the control unit determines that there is a consistency in the first check process, determines that there is no consistency in the second check process, and determines that there is no consistency in the third check process, the control unit determines that there is an inconsistency in the second configuration information acquired from the storage unit and corrects the second configuration information.

5. The communication system according to claim 1, wherein when the control unit determines that there is a consistency in the first check process, determines that there is a consistency in the second check process, and determines that there is no consistency in the third check process, the control unit determines that there is an inconsistency in the inside information acquired from the storage unit and corrects the inside information.

6. The communication system according to claim 1, wherein when the control unit determines that there is no consistency in the first check process, determines that there is a consistency in the second check process, and determines that there is a consistency in the third check process, the control unit determines that there is an inconsistency in the first hardware information acquired from the hardware and transmits an alarm to the management server.

7. The communication system according to claim 1, wherein when the control unit determines that there is a consistency in the first check process, determines that there is no consistency in the second check process, and determines that there is a consistency in the third check process, the control unit determines that there is an inconsistency in the first configuration information acquired from the management server and transmits an alarm to the management server.

8. A communication device that is controlled by control software, the communication device comprising:
   a storage unit;
   a control unit; and
   hardware, wherein
   the control unit stores, before updating the control software, information about the communication device in the storage unit,
   the control unit compares, after updating the control software, the information about the communication device stored in the storage unit with information about the communication device obtained after updating the control software, and performs predetermined processing based on a result of the comparison,
   the hardware holds, as first hardware information, hardware information indicating a setting content of the hardware set by a management server and a state of the hardware, and the control unit acquires, from the management server, first configuration information indicating a setting content set by the management server for the hardware, and a setting content set by the management server for a function implemented using the hardware, holds the acquired first configuration information as second configuration information, acquires the first hardware information from the hardware, holds the acquired first hardware information as second hardware information, and holds inside information indicating a state of the function, the control unit stores, before updating the control software, the second hardware information, the inside information, and the second configuration information in the storage unit, the second hardware information, the inside information, and the second configuration information being held by the control unit, the control unit acquires, after updating the control software, the second hardware information, the inside information, and the second configuration information from the storage unit, the first hardware information from the hardware, and the first configuration information from the management server, determines whether there is a consistency between the acquired pieces of information, determines, based on a result of the determination as to the consistency, whether there is an inconsistency in any one of the second hardware information, the inside information, and the second configuration information acquired from the storage unit, and corrects, when there is the inconsistency, information including the inconsistency among the second hardware information, the inside information, and the second configuration information acquired from the storage unit, the control unit performs, after updating the control software, a first check process for determining a consistency between the first hardware information acquired from the hardware and the second hardware information acquired from the storage unit, a second check process for determining a consistency between the first configuration information acquired from the management server and the second configuration information acquired from the storage unit, and a third check process for determining a consistency among the second hardware information, the inside information, and the second configuration information acquired from the storage unit, and determines, based on results of the determination as to the consistency in the first, second, and third check processes, whether there is an inconsistency in any one of the second hardware information, the inside information, and the second configuration information acquired from the storage unit.

9. The communication device according to claim 8, wherein the control unit includes a table in which a pattern of combinations of the state of the hardware, the second configuration information, and the inside information having a consistency is registered, in the first check process, when the first hardware information acquired form the hardware matches the second hardware information acquired from the storage unit, the control unit determines that there is a consistency between the first hardware information and the second hardware information, in the second check process, when the first configuration information acquired from the management server matches the second configuration information acquired from the storage unit, the control unit determines that there is a consistency between the first configuration information and the second configuration information, and in the third check process, when a pattern of combinations of the state of the hardware indicated by the second hardware information acquired from the storage unit and the second configuration information and the inside information acquired from the storage unit is registered in the table, the control unit determines that there is a consistency among the second hardware information, the inside information, and the second configuration information acquired from the storage unit.

10. The communication device according to claim 8, wherein when the control unit determines that there is no consistency in the first check process, determines that there is a consistency in the second check process, and determines that there is no consistency in the third check process, the control unit determines that there is an inconsistency in the second hardware information acquired from the storage unit and corrects the second hardware information.

11. The communication device according to claim 8, wherein when the control unit determines that there is a consistency in the first check process, determines that there is no consistency in the second check process, and determines that there is no consistency in the third check process, the control unit determines that there is an inconsistency in the second configuration information acquired from the storage unit and corrects the second configuration information.

12. The communication device according to claim 8, wherein when the control unit determines that there is a consistency in the first check process, determines that there is a consistency in the second check process, and determines that there is no consistency in the third check process, the control unit determines that there is an inconsistency in the inside information acquired from the storage unit and corrects the inside information.

13. The communication device according to claim 8, wherein when the control unit determines that there is no consistency in the first check process, determines that there is a consistency in the second check process, and determines that there is a consistency in the third check process, the control unit determines that there is an inconsistency in the first hardware information acquired from the hardware and transmits an alarm to the management server.

14. The communication device according to claim 8, wherein when the control unit determines that there is a consistency in the first check process, determines that there is no consistency in the second check process, and determines that there is a consistency in the third check process, the control unit determines that there is an inconsistency in the first configuration information acquired from the management server and transmits an alarm to the management server.

15. A communication method that is performed by a communication system including a communication device, including hardware, a storage unit, and a control unit, controlled by control software and a management server, the communication method comprising:

holding, by the management server, information about the communication device;

storing, by the communication device, information about the communication device before updating the control software; and comparing, by the communication device, the stored information about the communication device with information about the communication device obtained after updating the control software after updating the control software, and performs predetermined processing based on a result of the comparison;

configuring, by the management server, a setting for the hardware and a setting for a function implemented using the hardware, and holding, as first configuration information, configuration information indicating a setting content of the setting for the hardware and a setting content for the setting for the function;

holding, by the hardware, as first hardware information, hardware information indicating a setting content of the hardware set by the management server and a state of the hardware;

acquiring, by the control unit, the first configuration information from the management server and the first hardware information from the hardware, holding the acquired first configuration information and the acquired first hardware information as second configuration information and second hardware information, respectively, and holding inside information indicating a state of the function;

storing by the control unit, before updating the control software, the second hardware information, the inside information, and the second configuration information in the storage unit, the second hardware information, the inside information, and the second configuration information being held by the control unit;

acquiring by the control unit, after updating the control software, the second hardware information, the inside information, and the second configuration information from the storage unit, the first hardware information from the hardware, and the first configuration information from the management server, determining whether there is a consistency between the pieces of acquired information, determining, based on a result of the determination as to the consistency, whether there is an inconsistency in any one of the second hardware information, the inside information, and the second configuration information acquired from the storage unit, and correcting, when there is an inconsistency, information including the inconsistency among the second hardware information, the inside information, and the second configuration information acquired from the storage unit; and performing, by the control unit, after updating the control software, a first check process for determining a consistency between the first hardware information acquired from the hardware and the second hardware information acquired from the storage unit, a second check process for determining a consistency between the first configuration information acquired from the management server and the second configuration information acquired from the storage unit, and a third check process for determining a consistency among the second hardware information, the inside information, and the second configuration information acquired from the storage unit, and determining, based on a result of the determination as to the consistency in the first, second, and third check processes, whether there is an inconsistency in any of the second hardware information, the inside information, and the second configuration information acquired from the storage unit.

16. A communication method that is performed by a communication device controlled by control software, the communication method comprising:

storing information about the communication device before updating the control software; and comparing, after updating the control software, the stored information about the communication device with information about the communication device obtained after updating the control software, and performing predetermined processing based on a result of the comparison, holding, as first hardware information, hardware information indicating a setting content of the hardware set by a management server and a state of a hardware, and acquiring, from the management server, first configuration information indicating a setting content set by the management server for the hardware, and a setting content set by the management server for a function implemented using the hardware, holds the acquired first configuration information as second configuration information, acquires the first hardware information from the hardware, holds the acquired first hardware information as second hardware information, and holds inside information indicating a state of the function, storing, before updating the control software, the second hardware information, the inside information, and the second configuration information in a storage unit, the second hardware information, the inside information, and the second configuration information being held by the control unit, acquiring, after updating the control software, the second hardware information, the inside information, and the second configuration information from the storage unit, the first hardware information from the hardware, and the first configuration information from the management server, determining whether there is a consistency between the acquired pieces of information, determining, based on a result of the determination as to the consistency, whether there is an inconsistency in any one of the second hardware information, the inside information, and the second configuration information acquired from the storage unit, and correcting, when there is the inconsistency, information including the inconsistency among the second hardware information, the inside information, and the second configuration information acquired from the storage unit, performing, after updating the control software, a first check process for determining a consistency between the first hardware information acquired from the hardware and the second hardware information acquired from the storage unit, a second check process for determining a consistency between the first configuration information acquired from the management server and the second configuration information acquired from the storage unit, and a third check process for determining a consistency among the second hardware information, the inside information, and the second configuration information acquired from the storage unit, and determining, based on results of the determination as to the consistency in the first, second, and third check processes, whether there is an inconsistency in any one of the second hardware information, the inside information, and the second configuration information acquired from the storage unit.

* * * * *